United States Patent [19]

Kelm

[11] Patent Number: 4,575,284

[45] Date of Patent: Mar. 11, 1986

[54] DISTRIBUTION TUBE FOR PNEUMATIC APPLICATOR

[75] Inventor: Daniel W. Kelm, Winnipeg, Canada

[73] Assignee: Flexi-Coil Ltd., Saskatoon, Canada

[21] Appl. No.: 304,940

[22] Filed: Sep. 23, 1981

[30] Foreign Application Priority Data

Jul. 22, 1981 [CA] Canada .................................. 382218

[51] Int. Cl.[4] .............................................. B65G 47/24
[52] U.S. Cl. ......................................... 406/87; 406/92; 138/39; 111/34
[58] Field of Search ...................... 111/34; 406/86, 87, 406/92, 191, 193; 138/37, 39, 173, 121, 38; 141/392

[56] References Cited

U.S. PATENT DOCUMENTS

| 630,605 | 8/1899 | Gordon | 138/39 |
| 2,663,321 | 12/1953 | Jantsch | 138/38 |
| 3,380,783 | 4/1968 | Hunter | 406/191 |
| 3,631,825 | 1/1972 | Weiste | 111/11 |
| 4,004,615 | 1/1977 | Stern et al. | 138/39 |
| 4,024,822 | 3/1977 | Ross et al. | 111/34 |
| 4,204,491 | 5/1980 | Quick | 111/3 |

FOREIGN PATENT DOCUMENTS 867226 3/1971 Canada .
1025285 1/1978 Canada .

Primary Examiner—Houston S. Bell, Jr.
Attorney, Agent, or Firm—Burns, Doane, Swecker & Mathis

[57] ABSTRACT

A section of tube with a series of inwardly directed projections is placed in the main conduit of a pneumatic applicator, upstream of the primary distribution head. The inner projections in the tube serve to center the direction of the blown granular material into the primary distributor head. The projections are arranged in annular rows with the projections of each row being offset from those of an adjacent row.

20

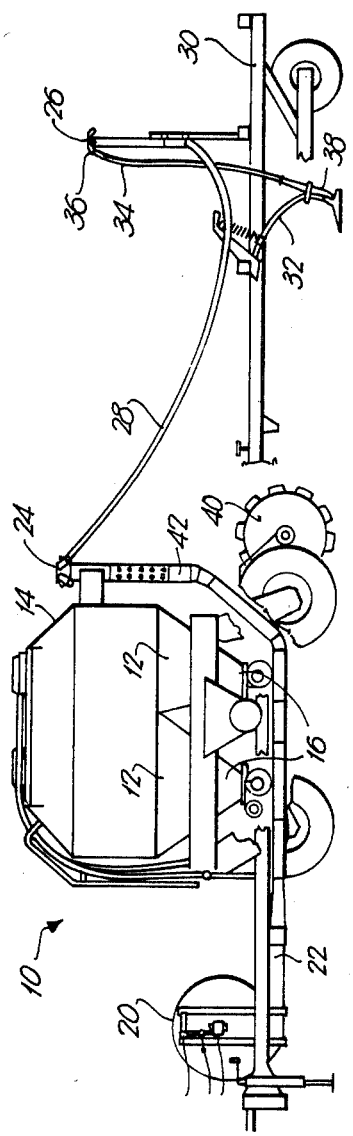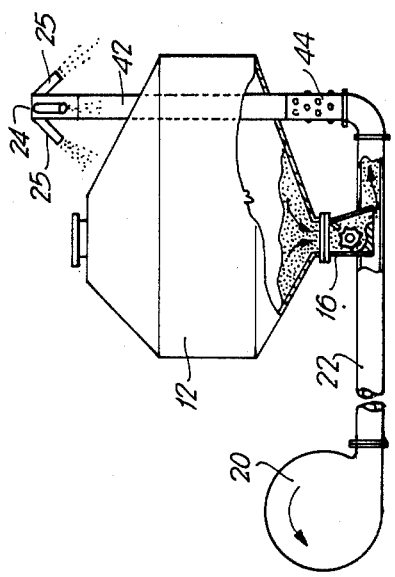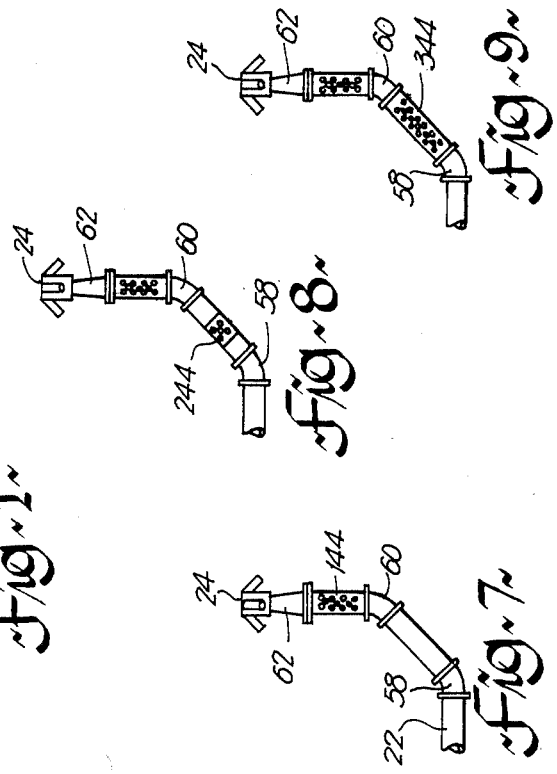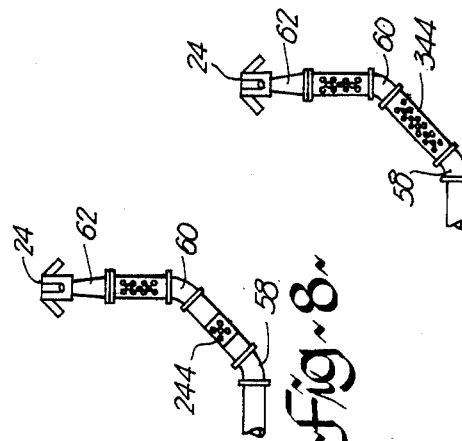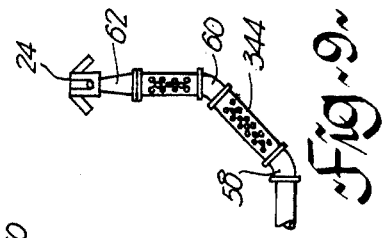

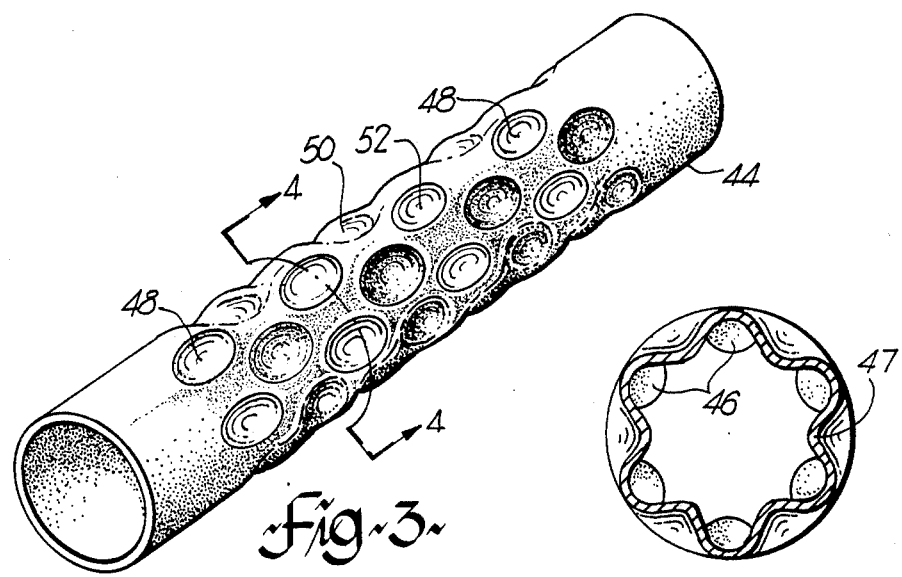
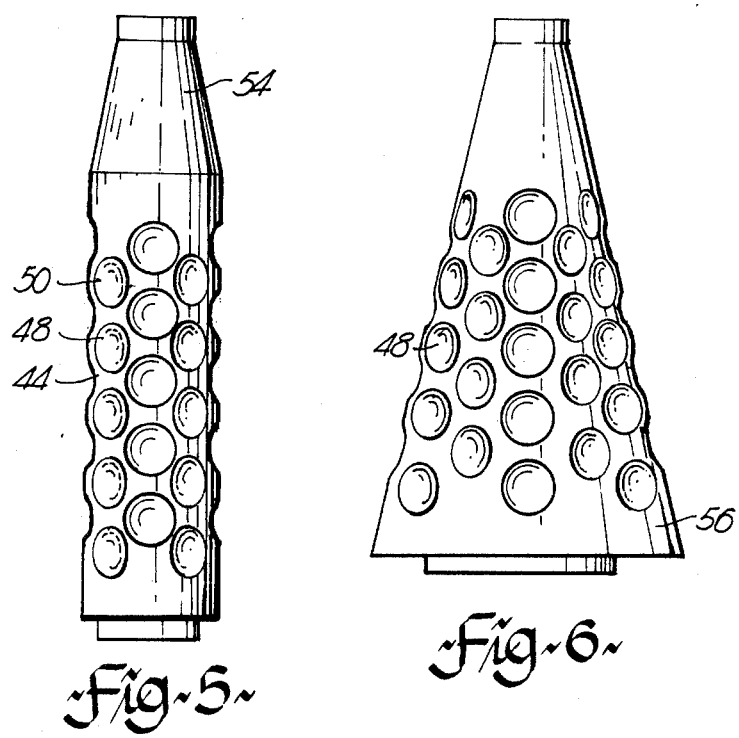

DISTRIBUTION TUBE FOR PNEUMATIC APPLICATOR

FIELD OF INVENTION

This invention relates to pneumatic applicators and in particular to the distribution systems thereof.

BACKGROUND OF THE INVENTION

Pneumatic applicators are used in seeding and fertilizing. Generally, such applicators consist of a pressurized hopper with a metering device in its lower end for the controlled feeding of granular material from the hopper into a main conduit extending from a fan to a primary distributing header. Branch lines run from the primary header to secondary headers which in turn feed seed boots associated with ground breakers. The pneumatic pressure of the fan creates an air stream which carries the granular material from the metering device to the primary and secondary headers and then to the individual seed boots via a network of flexible hoses.

Conventional pneumatic seeders and fertilizer applicators have problems in maintaining an acceptable distribution of seed or fertilizer across the width of the machine. This is due mainly to the fact that the granular material does not reach the primary header in a centered, accurate stream. While it is generally understood that a co-efficient of variation ($C_v$) of 15% across the width of the machine or spreading width is acceptable, this may be unacceptable to the farmer if one portion of the machine is applying a higher or leaner rate than another section.

As an example, primary distributing headers have anywhere from two to twelve dividing spouts or openings. If three openings are used on a header with a 15% variation between two of the openings, there would be an application rate difference from one section of the machine to another that would visually affect crop growth and yield.

It is therefore important to maintain a co-efficient of variation of less than 15% with an objective of achieving less than 5%.

SUMMARY OF THE INVENTION

The present invention provides a substantial improvement over conventional applicators in providing more acceptable levels of distribution. A section of tube having inwardly directed, internal projections is placed in the air stream or main conduit which carries the granular material to the primary distributor head or manifold. The arrangement of the internal projections are such that the stream of granular material is centrally directed into the header. One or more tube sections with inner projections can be used in the primary or main conduit and, depending on such variables as air velocity, density and type of material and quantity being conveyed, and type and speed of the metering device, the placement of the tube section or sections may be significant. In addition, the "dimpled" tube can be used in combination with other tube configurations such as straight or conical corrugated tube; near elbows; or venturi conical tubes. The shape of the dimpled tube can be either cylindrical, conical or oval, or a combination thereof.

According to one broad aspect, the present invention relates to a section of conveyor tube for use in the distribution system of a pneumatic applicator, said section having a dimpled exterior surface providing the interior with a plurality of inwardly directed, bulbous projections, said projections being grouped in annular rows with the projections of one row being offset with respect to the projections of an adjacent row.

According to another broad aspect, the invention relates to a primary conduit for use in a pneumatic applicator of the type using a primary dividing head for distributing granular material to a plurality of secondary headers. The primary conduit extends from at least the metering system of the application to the primary dividing head; said primary conduit including at least one section having an interior with a plurality of inwardly directed bulbous projections arranged in annular rows with the projections of one row being offset with respect to the projections of an adjacent row.

BRIEF DESCRIPTION OF THE INVENTION

The invention is illustrated by way of example in the accompanying drawings in which FIG. 1 is an elevation view, partly sectioned away of a pneumatic applicator;

FIG. 2 is a schematic view of an applicator showing it's method of operation;

FIG. 3 is a perspective view of a tube section having inwardly directed projections therein;

FIG. 4 is a sectional view taken along the line 4—4 of FIG. 3;

FIGS. 5 and 6 are elevation views of further embodiments of the invention; and

FIGS. 7, 8 and 9, on sheet 1, illustrate various locations of the "dimpled" tube in the primary or main conduit.

DETAILED DESCRIPTION

The term "dimpled tube" refers to the surface of the conduit shown in FIGS. 3 and 4 where the exterior of the tube is treated to provide the desired number of inwardly directed projections on the interior of the tube as shown in FIG. 4. This gives the exterior of the tube a dimpled configuration. However, it will be appreciated that tubes could be manufactured from heavy plastic or similar materials that would have the inwardly directed projections on the inside of the tube but would not necessarily have a dimpled configuration on the outside. The term "dimpled tube" is not therefore to be considered limiting in the following description.

Referring to FIG. 1, a pneumatic applicator of the type with which the present invention would be used is illustrated in combination with a cultivator. The applicator shown generally at 10 consists of one or more tanks 12 in a hopper 14, the lower ends of the tanks 12 having metering devices 16. A fan 20 provides an air stream of suitable velocity into a primary pneumatic conduit 22 that extends from the fan to a primary dividing header or manifold 24. As will be seen schematically in FIG. 1, the metering devices 16 provide controlled feeding of granular materials such as seed or fertilizer from the tanks 12 which are pressurized into the air stream in the conduit 22. The granular material is blown into the primary dividing header 24 and thereafter to a plurality of secondary headers 26 (only one of which is shown) by way of associated, flexible hoses 28. The secondary header 26 is suitably mounted on a frame 30 of a cultivator or the like on which a plurality of ground openers 32 are secured. Flexible hoses 34 extend from the openings or branches 36 in the secondary header to a seed boot 38 secured to and associated with the ground opener 32. The metering devices 16 on the tanks 12 are actuated through a drive wheel 40 bounded on the frame of the pneumatic applicator 10.

A somewhat enlarged, schematic view of the apparatus is shown in FIG. 2 which shows the air stream picking up the granular material from the metering device 16, the conduit 22 carrying it via a vertically oriented stack 42 to the primary header 24 and the seed being distributed as evenly as possible therefrom via the branches 25. The dimpled tube 44 of the present invention is positioned in the stack 42 to give the desired direction to the granular material.

In order to obtain the desired, even distribution of granular material from the primary header 24, it is necessary to direct the granular material as centrally as possible to the inner surface of the header 24. To this end, the present invention comprises a section of conveyor tube 44 of metal or any other suitable substance, the interior of the tube being provided with a plurality of inwardly directed, bulbous projections 46 which, in the illustrated embodiment, are made through the application of dimples 48 in the exterior of the tube as shown in FIGS. 3 and 4. The inwardly directed projections 46 are grouped in annular rows 50 and each row is staggered or offset to some extent with respect to an adjacent row. Thus, the projections 46 in annular row 50 are offset with respect to the projections 47 in annular row 52. In the illustrated embodiment of FIG. 4, the projections (and dimples) are in annular rows of six and approximately every one and one half inches along the length of the tube 44 of the row is repeated with an approximately 30° offset from the previous row. This provides the interior as shown in FIG. 4, the projections 46 and 47 causing the air stream and the granular material carried thereby, to be directed towards the central longitudinal axis of the tube 44 and away from the walls thereof.

The tube 44 can be positioned in various locations in the vertical stack 42 of the primary conduit and acceptable results have been obtained at such various locations. Tube 44 can be a single section of straight walled tube of the type shown in FIG. 3 or it can be combined with a conical end portion 54 as shown in FIG. 5. Further form of the tube can be in a complete frusto-conical configuration 56 as shown in FIG. 6, the conical end 54 or the frusto-conical configuration 56 serving to gradually narrow down the air stream and to increase the velocity thereof adjacent the primary header 24.

Numerous tests have been carried out with the present invention incorporated in the pneumatic system of an applicator 10. In one test, a dimpled tube 44 was positioned in an arrangement similar to that of FIG. 2 where the overall height of the stack 42 was 98½ inches. The dimpled tube 44 was approximately 12 inches in overall length with the lower end thereof being positioned approximately 13¼ inches above the center line of the horizontal primary tube 22. With thirty outlets and a fan speed of 4,000 r.p.m. and a metering cup setting of 5, the co-efficient of variation at the primary manifold or header 24 was 1.35.

In an arrangement illustrated schematically in FIG. 7, the primary conduit 22 joins the stack through a pair of 45° elbows 58 and 60. A dimpled tube 144 was positioned between the upper elbow 60 and a tapered casting 62, the upper end of which terminated at the primary header 24. With a fan speed of approximately 3,500 r.p.m. and a cup setting of 5 the co-efficient of variation was 1.221%.

In an arrangement illustrated in FIG. 8, an additional two rows of dimples and inwardly directed projections were added at 244 intermediate the elbows 60 and 58. This gave a co-efficient of variation of 1.175%. In the arrangement of FIG. 9, a dimpled tube 344 of substantial length was placed between the elbows 60 and 58 with the resulting co-efficient of variation being at 1.10%.

While the invention has been described in connection with specific embodiments thereof and in specific uses, various modifications will occur to those skilled in the art without departing from the spirit and scope of the invention as set forth in the appended claims.

The terms and expressions which have been employed in this specification are used as terms of description and not of limitation and there is no intention in the use of such terms and expressions to exclude any equivalents of the features shown and described or portions thereof. It is recognized that various modifications are possible within the scope of the invention as claimed.

The embodiments of the invention in which an exclusive property or privilege is claimed are defined as follows:

1. In a pneumatic applicator having a conduit for delivering pneumatically carried granular material to a distributing header, the improvement comprising a section of said conduit having an interior with a plurality of inwardly directed projections, said projections being grouped in annular rows with the projections of one row being offset with respect to the projections of an adjacent row, said inwardly directed projections centering said granular material being conveyed by said conduit.

2. The pneumatic applicator according to claim 1 wherein the section is frusto-conical in configuration.

3. The pneumatic applicator according to claim 1 wherein one annular row is offset 30° from an adjacent row.

4. A pneumatic applicator comprising a primary dividing head in communication with a plurality of secondary headers; means for producing a pneumatic stream carrying granular material; a primary conduit for conveying said pneumatic stream to the primary dividing head; said primary conduit including at least one section having an interior with a plurality of inwardly directed, bulbous projections arranged in annular rows with the projections of one row being offset with respect to the projections of an adjacent row, said projections centering the granular material being conveyed by said primary conduit.

5. The pneumatic applicator according to claim 1 wherein the section is straight with a tapered end portion.

6. The pneumatic applicator according to claim 4 wherein said section is in a straight piece of conduit spaced upstream from said primary dividing head.

7. The pneumatic applicator according to claim 4 wherein said conduit is tapered between said section and the primary dividing head.

8. A pneumatic applicator comprising:
a dividing header; and
a pneumatic conduit for delivering a pneumatic flow carrying granular material to said dividing header, said pneumatic conduit including at least one section having an interior with a plurality of inwardly directed projections arranged in annular rows with the projections of one row being offset with respect to the projections of an adjacent row, said inwardly directed projections centering said granular material being conveyed by said conduit.

9. The pneumatic applicator according to claim 9 wherein the projections of one annular row at least partially overlaps the projections of an adjacent row.

10. The pneumatic applicator according to claim 1 wherein the projections of one annular row at least partially overlaps the projections of an adjacent row.

11. The pneumatic applicator according to claim 4 wherein the bulbous projections of one annular row at least partially overlaps the bulbous projections of an adjacent row.

12. The pneumatic applicator according to claim 1, wherein said projections are bulbous.

13. The pneumatic applicator according to claim 8, wherein the section is frusto-conical in configuration.

14. The pneumatic applicator according to claim 8 wherein one annular row is offset 30° from an adjacent row.

15. The pneumatic applicator according to claim 8 wherein the section is straight with a tapered end portion.

16. The pneumatic applicator according to claim 8 wherein the section is in a straight piece of conduit spaced upstream from said dividing header.

17. The pneumatic applicator according to claim 8 wherein the conduit is tapered between the section and the dividing header.

18. The pneumatic applicator according to claim 8 wherein the conduit is tapered between the section and the dividing header.

19. The pneumatic applicator according to claim 8 wherein the projections are bulbous.

20. The pneumatic applicator according to claim 1 wherein the section is in a straight piece of conduit.

* * * * *